US011470400B2

(12) United States Patent
Heller et al.

(10) Patent No.: US 11,470,400 B2
(45) Date of Patent: Oct. 11, 2022

(54) DELIVERY FORECAST COMPUTING APPARATUS FOR DISPLAY AND STREAMING VIDEO ADVERTISING (71) Applicant: FreeWheel Media, Inc., San Mateo, CA (US)

(72) Inventors: Jonathan Marc Heller, San Francisco, CA (US); Michael Henry Evangelista, Metuchen, NJ (US); Jingchun Yu, Palo Alto, CA (US)

(73) Assignee: FreeWheel Media, Inc., Philadelphia, PA (US)

( * ) Notice: Subject to any disclaimer, the term of this patent is extended or adjusted under 35 U.S.C. 154(b) by 102 days.

(21) Appl. No.: 16/819,819

(22) Filed: Mar. 16, 2020

(65) Prior Publication Data
US 2020/0221189 A1 Jul. 9, 2020

Related U.S. Application Data (63) Continuation of application No. 13/890,163, filed on May 8, 2013, now abandoned, which is a continuation
(Continued)

(51) Int. Cl.
H04N 21/81 (2011.01)
G06Q 30/02 (2012.01)
G16Y 10/45 (2020.01)

(52) U.S. Cl.
CPC ........... *H04N 21/812* (2013.01); *G06Q 30/02* (2013.01); *G06Q 30/0272* (2013.01); *G16Y 10/45* (2020.01)

(58) Field of Classification Search
CPC ... H04N 21/812; G06Q 30/0272; G06Q 30/02
See application file for complete search history.

(56) References Cited

U.S. PATENT DOCUMENTS 5,629,980 A    5/1997  Stefik et al.
5,740,549 A *  4/1998  Reilly ................ G06Q 30/0243
                                                  705/14.42
(Continued)

FOREIGN PATENT DOCUMENTS

CN    101657835 A    2/2010
CN    102171671 A    8/2011
(Continued)

OTHER PUBLICATIONS

F. Chehimi, P. Coulton and R. Edwards, "Augmented Reality 3D Interactive Advertisements on Smartphones," International Conference on the Management of Mobile Business (ICMB 2007), 2007, pp. 21-21, doi: 10.1109/ICMB.2007.20. (Year: 2007).*
(Continued)

*Primary Examiner* — Sun M Li
(74) *Attorney, Agent, or Firm* — Banner & Witcoff, Ltd.

(57) ABSTRACT

A computer-driven apparatus coupled to a network receives data from metadata sources and consumers' display devices. From the sources, the apparatus collects metadata concerning characteristics of a given item of host video and a proposed class of advertisements for web delivery proximate or embedded in the given item. The apparatus continually monitors actual delivery of the given item by receiving transmissions from consumers' display devices. The apparatus develops initial forecasting inputs based on historical data from similar host videos, and then adjusts the forecasting inputs based on the actual deliveries. These forecasting inputs are used to compute an interim supply of advertising opportunities associated with the given item, which is reduced by relevant factors to provide a net available supply forecast. The apparatus provides a human-readable display of information including the net available supply forecast.

54 Claims, 4 Drawing Sheets

Related U.S. Application Data of application No. 13/119,223, filed as application No. PCT/US2009/057100 on Sep. 16, 2009, now abandoned.

(60) Provisional application No. 61/097,219, filed on Sep. 16, 2008.

(56) References Cited

U.S. PATENT DOCUMENTS

| | | | |
|---|---|---|---|
| 5,754,938 | A | 5/1998 | Herz et al. |
| 6,717,522 | B1 | 4/2004 | Nagatomo et al. |
| 6,865,719 | B1 | 3/2005 | Nicholas, III |
| 6,983,371 | B1 | 1/2006 | Hurtado et al. |
| 7,788,583 | B1 * | 8/2010 | Amzallag ............ H04N 21/4143 |
| | | | 715/788 |
| 8,108,895 | B2 | 1/2012 | Anderson et al. |
| 8,949,882 | B2 | 2/2015 | Sherwin et al. |
| 8,955,006 | B2 | 2/2015 | Fang et al. |
| 2001/0013015 | A1 | 8/2001 | Hunter |
| 2002/0010624 | A1 | 1/2002 | Tomita et al. |
| 2002/0112171 | A1 | 8/2002 | Ginter et al. |
| 2003/0171990 | A1 | 9/2003 | Rao et al. |
| 2003/0229549 | A1 | 12/2003 | Wolinsky et al. |
| 2004/0064351 | A1 | 4/2004 | Mikurak |
| 2004/0107125 | A1 | 6/2004 | Guheen et al. |
| 2004/0194131 | A1 | 9/2004 | Ellis et al. |
| 2004/0249726 | A1 | 12/2004 | Linehan |
| 2005/0021403 | A1 | 1/2005 | Ozer et al. |
| 2005/0119936 | A1 | 6/2005 | Buchanan et al. |
| 2005/0180431 | A1 | 8/2005 | Kinoshita et al. |
| 2005/0182792 | A1 | 8/2005 | Israel et al. |
| 2005/0251820 | A1 | 11/2005 | Stefanik et al. |
| 2006/0080171 | A1 | 4/2006 | Jardins et al. |
| 2006/0092282 | A1 | 5/2006 | Herley et al. |
| 2006/0287916 | A1 | 12/2006 | Starr et al. |
| 2007/0005795 | A1 | 1/2007 | Gonzalez |
| 2007/0033531 | A1 | 2/2007 | Marsh |
| 2007/0078714 | A1 | 4/2007 | Ott et al. |
| 2007/0106550 | A1 * | 5/2007 | Umblijs ............ G06Q 30/0201 |
| | | | 705/7.12 |
| 2007/0130015 | A1 | 6/2007 | Starr et al. |
| 2007/0130023 | A1 | 6/2007 | Wolinsky et al. |
| 2007/0153703 | A1 | 7/2007 | Floyd |
| 2007/0162926 | A1 * | 7/2007 | Steelberg ............ H04L 63/0428 |
| | | | 725/34 |
| 2007/0204310 | A1 | 8/2007 | Hua et al. |
| 2007/0239533 | A1 | 10/2007 | Wojcicki et al. |
| 2007/0288309 | A1 | 12/2007 | Haberman et al. |
| 2007/0288951 | A1 | 12/2007 | Ray et al. |
| 2008/0046315 | A1 | 2/2008 | Axe et al. |
| 2008/0091524 | A1 | 4/2008 | Yan et al. |
| 2008/0109306 | A1 | 5/2008 | Maigret et al. |
| 2008/0109363 | A1 | 5/2008 | Fassett |
| 2008/0154739 | A1 | 6/2008 | Kalaboukis |
| 2008/0154767 | A1 | 6/2008 | D'Agostino |
| 2008/0183573 | A1 | 7/2008 | Muschetto |
| 2008/0195483 | A1 * | 8/2008 | Moore ................. G06F 16/958 |
| | | | 705/14.69 |
| 2008/0208668 | A1 | 8/2008 | Heller et al. |
| 2008/0214148 | A1 | 9/2008 | Ramer et al. |
| 2008/0215747 | A1 | 9/2008 | Menon et al. |
| 2008/0275763 | A1 | 11/2008 | Tran et al. |
| 2009/0006937 | A1 | 1/2009 | Knapp et al. |
| 2009/0157491 | A1 | 6/2009 | Brougher et al. |
| 2009/0192860 | A1 | 7/2009 | Heller et al. |
| 2009/0234861 | A1 | 9/2009 | Ramer et al. |
| 2009/0278861 | A1 * | 11/2009 | Price ................. G06Q 30/0283 |
| | | | 705/14.69 |
| 2009/0287837 | A1 | 11/2009 | Felsher |
| 2010/0094713 | A1 | 4/2010 | Wax |
| 2010/0094878 | A1 | 4/2010 | Soroca et al. |
| 2011/0191190 | A1 | 8/2011 | Heller et al. |
| 2013/0247084 | A1 | 9/2013 | Heller et al. |
| 2015/0163560 | A1 | 6/2015 | Holley et al. |

FOREIGN PATENT DOCUMENTS

| | | |
|---|---|---|
| EP | 2115678 A1 | 11/2009 |
| EP | 2329394 A1 | 6/2011 |
| WO | 2008106241 A1 | 9/2008 |
| WO | 2010033551 A1 | 3/2010 |

OTHER PUBLICATIONS

U.S. Appl. No. 11/966,893, Method and Apparatus for Dynamically Allocating Monetization Rights and Access and Optimizing the Value of Digital Content, filed Dec. 28, 2007.

U.S. Appl. No. 12/357,228, A System and Method for Managing Business Partnerships as they Evolve Across All Aspects of the Content Creation and Advertising Value Chain, filed Jan. 21, 2009.

U.S. Appl. No. 13/890,163, Delivery Forecast Computing Apparatus for Display and Streaming Video Advertising, filed May 8, 2013.

David Padua, The Fortran I Compiler, IEEE, Computing in Science & Engineering, Jan. 2000.

Statement in accordance with the Notice from the EPO dated Oct. 1, 2007, XP002456252, 1 page.

International Preliminary Report on Patentability, dated Sep. 3, 2009, in related PCT patent application PCT/US2008/050599, 9 pages.

International Search Report and Written Opinion, dated Jul. 8, 2008, in related PCT patent application PCT/US2008/050599, 12 pages.

Supplementary European Search Report for EP 08727463.5 dated Dec. 23, 2010.

International Search Report dated Nov. 6, 2009, in PCT patent application PCT/US2009/057100, 2 pages.

Supplementary European Search Report for EP 09815089 dated Jan. 20, 2012.

* cited by examiner

DELIVERY FORECAST COMPUTING APPARATUS FOR DISPLAY AND STREAMING VIDEO ADVERTISING

CROSS-REFERENCE TO RELATED APPLICATIONS

This application is a continuation of 13,890,163, filed May 8, 2013, which is a continuation of Ser. No. 13/119,223, filed Apr. 11, 2011, which is a U.S. National Phase entry of International Patent Application No. PCT/US2009/057100, filed Sep. 16, 2009 and claims priority to U.S. Patent Application No. 61/097,219, filed Sep. 16, 2008 in the name of Jonathan Heller and entitled SYSTEM AND METHOD FOR FORECASTING THE AGGREGATE VOLUME OF FUTURE EVENTS FOR NUMEROUS ITEMS OF DIGITAL CONTENT AVAILABLE FOR CONSUMPTION FROM NUMEROUS DIFFERENT POINTS OF ACCESS. The entirety of the foregoing applications are incorporated herein by reference.

BACKGROUND OF THE INVENTION

1. Field of the Invention

The invention relates to digital data processing machines. More particularly, the invention concerns a digital data processing machine configured to gather machine-readable data relevant a given item of host video content and a proposed class of advertising opportunities provided by the host video, and to generate a forecast as to future viewing of advertisements of the proposed class, provide a human-readable output based on the forecast.

2. Description of the Related Art

The internet has become a major means of distributing digital content. Much of this content is advertising supported. A fundamental need of any advertising sales business is the ability to forecast how many times how many people will view their content and how much resulting advertising inventory is available for sale.

Traditionally the advertising properties on the web are destinations where users come to repeatedly access content. This creates a historical trend of content consumption that can be used to project, or forecast, future content consumption. This is the method that is traditionally used to forecast future events like future available ad inventory.

With the advent of video as a major type of content consumed online, a fundamental change has occurred in user consumption patterns. This change renders historical trend projection inaccurate as a means of forecasting future events. With some forms of digital content, such as video, the individual item of content is what draws the consumer and creates advertising inventory. It is no longer true that the destination where the content is on display draws the audience only but now the item of content itself can draw the audience. As an example, consumers will go to watch a particular episode newly released of their favorite show as opposed to going to a particular destination regularly just to see what content is there that day, such as on a news site. So, an individual video has its own identity and audience draw whereas a web page or article may not.

This creates a fundamental change in the patterns of content consumption for these types of content which in turn require a new and unique method of forecasting future events based on such content consumption.

With content items with their own consumer identity, such as video, forecasting based solely off of past trends does not incorporate the key drivers of consumption and will not be an accurate forecast. As discovered by the inventors, this is because volume of consumption and the resultant number of events to forecast, for aggregations of content with individual identity, has many driving factors that are not reflected in past behavior. These driving factors are explained further below.

Because existing forecasting methods for events driven by digital content consumption are not aware of such drivers, they are not accurate forecasts for content where the item itself is the draw and it is syndicated across numerous partners.

Another shortcoming of existing forecasting methods is that they fail to adequately translate forecasted content consumption into advertising inventory available for sale. For a unit of advertising inventory to be available for sale, it must be physically capable of displaying the desired advertisement itself. For example, if someone wants to put an ad in slot A, the ad must physically fit into slot A to be a truly useable available spot. If the slot does not fit the ad, then the ad is not truly available. With digital content on display in many syndicated locations, there is great variability into what types of advertisements are allowed to show in different such locations. As discovered by the inventors then, the existing forecasting methods lack adequate practical use because they are not fully aware of such constraints, both physical and by business term, and show only those available ad inventory units that are capable of actually displaying the advertisement in question.

SUMMARY OF THE INVENTION

A computer-driven apparatus coupled to a network receives data from metadata sources and consumers' display devices. From the sources, the apparatus collects metadata concerning characteristics of a given item of host video and a proposed class of advertisements for web delivery proximate or embedded in the given item. The apparatus continually monitors actual delivery of the given item by receiving transmissions from consumers' display devices. The apparatus develops initial forecasting inputs based on historical data from similar host videos, and then adjusts the forecasting inputs based on the actual deliveries. These forecasting inputs are used to compute an interim supply of advertising opportunities associated with the given item, which is reduced by relevant factors to provide a net available supply forecast. The apparatus provides a human-readable display of information including the net available supply forecast.

DETAILED DESCRIPTION

The nature, objectives, and advantages of the invention will become more apparent to those skilled in the art after considering the following detailed description in connection with the accompanying drawings.

Overview

The described system solves problems inherent in forecasting numerous items with their own consumption patterns across numerous distribution points. It also incorporates numerous drivers for consumption into its forecast, including those that are not reflective in past behavior.

The system is designed to forecast across many items that all have their own characteristics in terms of popularity, pattern of consumption over their life, legal display rights and on how many and how big distribution points are they on display. In addition, the system and method is designed to apply similar or "template" patterns of behavior to future items that have no history to extrapolate. Lastly, as history does accumulate and real user consumption patterns emerge, the template patterns automatically adjust to reflect the actual patterns of consumption and extrapolate the future consumption off this new informed history.

First, the system forecasts each item individually. Forecasts at levels of many items are aggregations of forecasts at the individual item level. By forecasting items individually, the system is able to incorporate item level data critical to projecting consumption in an environment where many drivers of the items consumption are particular to that item and are not reflective in past behavior, such as the following.

LEGAL DISPLAY RIGHTS. This includes dates when an item will start on display and when it will end. This is important for two reasons. First, forecasting consumption for an item before it is allowed on display will be inaccurate and over count. However, it is critical to be able to forecast items in advance of their display date to be able to sell advertising into that item in advance. The television up-fronts are an example where much advertising is sold into shows that will not air for months. So, being aware, item by item, of when it will start display makes this possible. Second, forecasting consumption of an item after it is to be taken down and no longer available for viewing would be a bad over counting of events. By being aware of display rights end dates, the system will not forecast consumption after the item is not available to be consumed.

CONSUMPTION PATTERN OF THAT TYPE OF ITEM. Awareness of the type of item it is enables the system to forecast different consumption patterns for a blockbuster movie than for a small unknown video.

AGE OF ITEM. Since consumption patterns for content like video decay rapidly over time, if a system only forecasts from past patterns, the system will over count and miss the drop off that comes with aging into "old news." The present system is aware of both the age of the item and the consumption pattern of the item and can be aware in advance of when a drop off in consumption is likely to occur and incorporate that into the forecast.

Second, the system is able to apply similar type item consumption patterns to new items that have not established their own actual consumption pattern yet. The total library of content items, such as videos, is in frequent and constant churn. New videos are being added all the time. Many such new videos have not been displayed yet or are not scheduled to be displayed for some time. The system can apply the consumption pattern of like videos to such new videos and forecast based on similarity to other videos. Importantly, the system is self learning in that it will automatically adjust this "template pattern" consumption forecast for actual consumption as it occurs.

Third, the system can be made aware of the number and size of distribution points on which the content items are on display. In this way, as the size of the content companies syndication partner set grows, the size of the possible consumption of its content grows and the forecast reflects that.

Fourth, the system is aware of any technical or business term constraints limiting which types of advertisements are capable of serving into which distribution display points. In this way, even if one hundred possible advertising inventory units were forecast to exist, if twenty did not allow that particular advertisement in question to display, the forecast would only show eighty possible.

Last, the system will add up the individual forecasts of the individual items in order to produce the forecast for any aggregation of items. This means that as the library of individual items ages and changes mix of types of items and age of items, the aggregate forecast will reflect that. Simply extrapolating off past aggregate behavior, such as existing systems do, implies the same mix of age and type of items. In a business like video where new episodes and types of content are constantly cycling in and out of a company's library of items, this past assumed mix will be inaccurate. It is necessary to add the individual forecasts of the actual items in the current library to be accurate.

Hardware Components and Interconnections

Overall Structure

Figure 1:
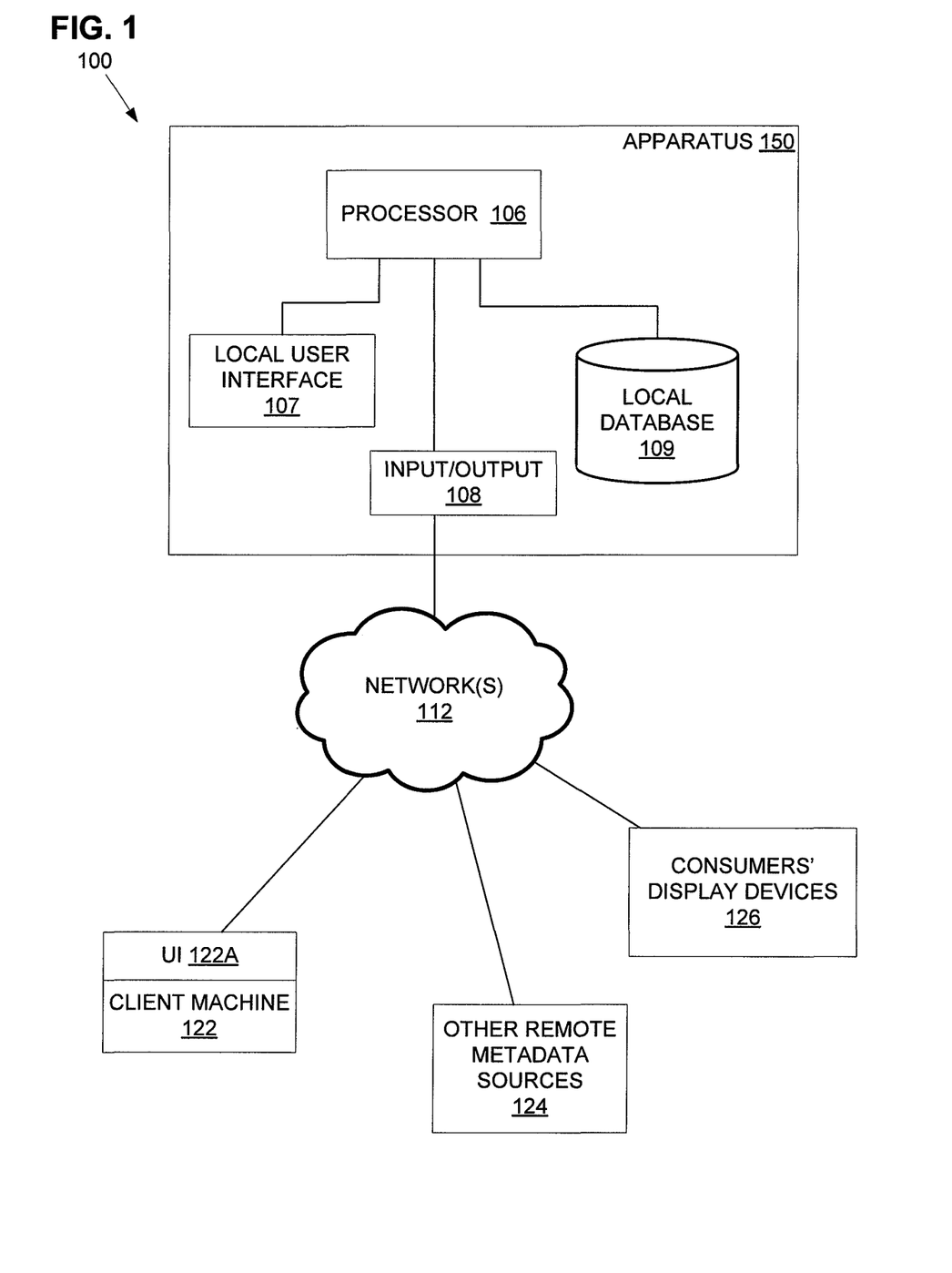
FIG. 1 is a block diagram of the components and interconnections of an exemplary delivery forecast computing apparatus for display and streaming video advertising.

One aspect of this disclosure concerns a delivery forecast computing apparatus 150. The apparatus 150 computes delivery forecasts for display and streaming video advertising. In the present example, the apparatus 150 is managed by an entity such as a forecasting company (not shown).

The apparatus 150 is shown in an exemplary environment 100, which includes the following components. A network 112 connects the apparatus 150 to other components 122*a*, 124, 126. The network 112 may be implemented by the Internet, or any other network appropriate to this disclosure regardless of protocol and conveyance means, with some examples including LAN, WAN, HTTP, token ring, Ethernet, wireless, fiber optics, ISDN, telephony, satellite, and the like.

A client machine 122 includes a user interface 122*a* operated by a client (not shown). In one example, the client is a seller of online advertising opportunities that occur in conjunction with streaming video content. The client machine 122, in this example, is implemented by any desktop or notebook personal computer, computer workstation, or other computing device with sufficient power and capabilities to interface with the apparatus 150 in the manner discussed below. In a specific example, the client machine 122 is a personal computer and the user interface 122*a* is a web browser.

Among other interactions, the client machine 122 transmits various metadata to the apparatus 150, under direction of the client. This transmission may occur automatically ("push"), on demand by the apparatus 150 ("pull"), or in response to direction by a human located at the remote source or remotely. In one example, the metadata occurs in a format that is predetermined by the forecasting company. One example is a comma-separated-value (CSV) format, including some prescribed identity and order of the various constituent fields. In one example, the client machine 122 is operated by an advertising company that has hired the forecasting company to develop forecasts as to the viewing of the advertising opportunities provided by the advertising company.

Of course, there may be multiple clients and multiple client machines 122, but a single one is given here for simplicity of discussion. The apparatus 150 may additionally gather metadata apart from the client machine 122. The sources of this metadata are illustrated by 124. These include other computers, databases, data entry terminals, news sources, web sites, and the like.

The display devices 126 are operated by members of the public without any required affiliation with the advertising company or forecasting company. The display devices 126 include various embodiments, such as a web browser running on a computer, television cable or other set top box, DVR, mobile telephone, PDA, or other device capable of displaying online video content. Operators of the display devices 126 are referred to as consumers.

The forecasting company monitors people's viewing of online advertisements. Namely, for certain online ads, the display devices 126 are programmed to transmit information to the apparatus 150 whenever the consumer elects to view that advertisement. Alternatively, the devices 126 may transmit information to a third party such as 122 or 124, which aggregates such information and submits it to the apparatus 150. In any case, the transmitted information includes the identity of online ad that was viewed, URL hosting the online ad, the time when viewing began, the length of viewing, and the like. The transmission of such information to the apparatus 150 or third party may be conducted by a browser plug-in, java applet, HTML code used to present the advertisement, or another technology. The technology for achieving this is widely known in the field of Internet advertising metrics.

As to the apparatus 150 itself, operations are managed by a processor 106. The processor 106 may be implemented by one or more hardware devices, software devices, a portion of one or more hardware or software devices, or a combination of the foregoing. The makeup of some exemplary digital data processing components is described in greater detail below, with reference to FIGS. 2-4.

A local user interface 107 provides a means for a human to locally communicate with the apparatus 150, and may include items such as a video display, speakers, keyboard, mouse, touchpad, digitizing pad, eye gaze tracking system, voice recognition module, etc. The input/output 108 provides an interface between the processor 106 and the network 112. Although the implementation of the input/output 108 varies according to the type of network 112 and connection to the network 112, some examples include cable modem, satellite modem, DSL modem, WiFi or WiMax modem, and Ethernet card. The processor 106 uses the local database 109 to store data accumulated from the metadata sources 124. The database 109 may be implemented by various digital data storage technologies, as described in greater detail below.

Exemplary Digital Data Processing Apparatus

As mentioned above, data processing entities, such as the processor 106, may be implemented in various forms. Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
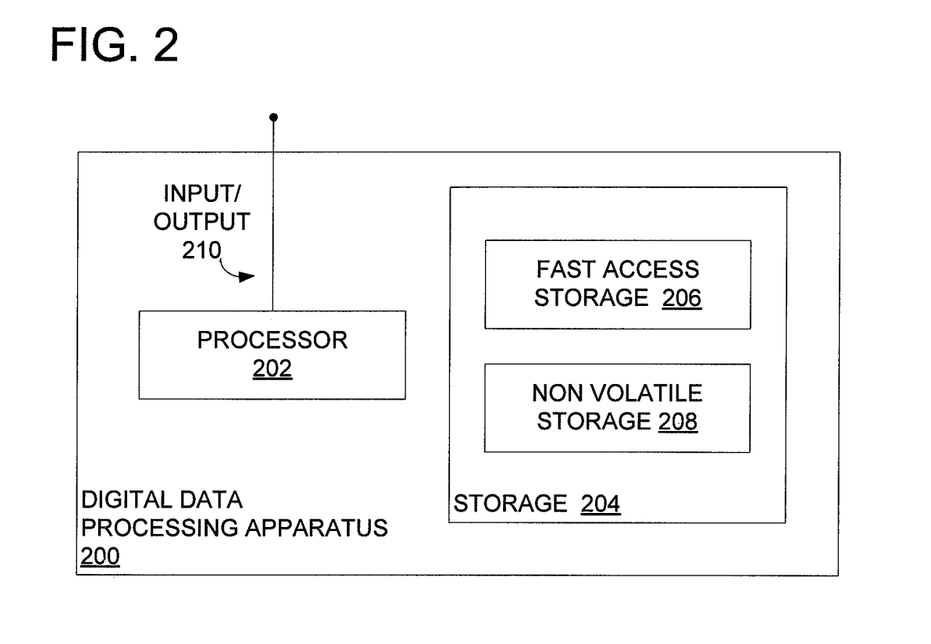
FIG. 2 is a block diagram of an exemplary digital data processing machine.
Figure 3:
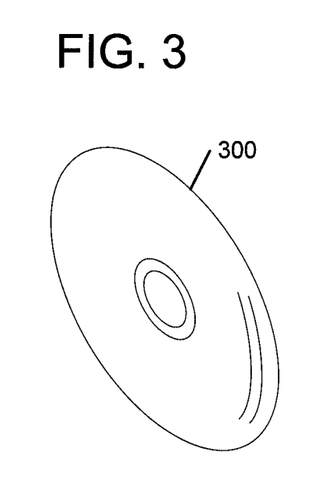
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide the database 109 (FIG. 1), to embody the storage 204 and 208 (FIG. 2), to store programming of the apparatus 150, and the like. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc. Storage of data or programming need not be limited to a single one of such devices, but may be distributed across two or more storage units.

In one example, a storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions, as described above, a different embodiment uses logic circuitry to implement processing features such as the processor 106.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
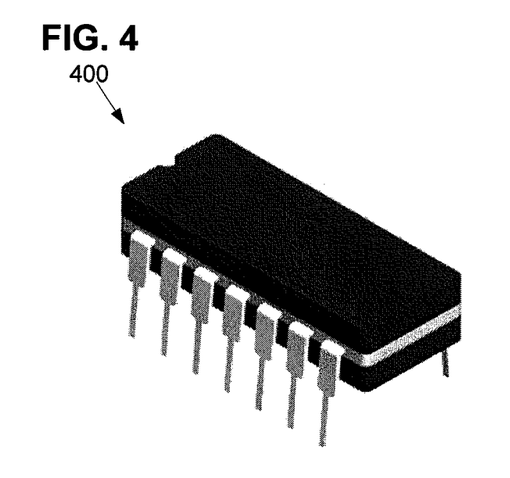
FIG. 4 is a perspective view of exemplary logic circuitry.

FIG. 4 shows an example of logic circuitry in the form of an integrated circuit 400.

Operation

Having described various structural features, the next description concerns an operational aspect. The steps of any method, process, or algorithm described in connection with the embodiments disclosed herein may be embodied directly in hardware, in a software module executed by hardware, or in a combination of these.

Overview

As mentioned above, forecasting techniques based on past trends alone do not incorporate the key drivers of consumption and will not be an accurate forecast. As discovered by the inventors, this is because volume of consumption and the resultant number of events to forecast, for aggregations of content with individual identity, has many driving factors that are not reflected in past behavior. Some of these factors include the following.

(A) Rapid and spiky life cycle of consumption. This is because initial popularity drives a lot of viewers but once it is old news many fewer people will consume the content. This is particularly true for video. So, past viewing patterns do now indicate when a video is aging into old news and will start to decline (B) Number of distribution points or places where that content is on display. Video, unlike traditional web pages, is often widely syndicated and put on display on numerous locations. The size of audience of these various locations will also directly impact total views of the content on display. For example, if a video is on display only on website X it will receive fewer views than if it is also put on display on web portal A, B and C. Since these syndication deals go on and off frequently, a forecast must be aware of the number and size and timing of such syndication partners to correctly forecast consumption and related events.

(C) Legal display rights. Much digital content is owned by one company but displayed by a different company. These companies enter into rights arrangements where the display company will contract with the owning company for when and where they are allowed to display particular content. These display rights windows change, opening up and shutting down, frequently. They also change by item of content to item of content. The present system looks ahead, to be aware of when such rights windows open and close, enhancing the accuracy of the forecast.

(D) Level of promotion. Much of television advertising is really promotions running ads promoting other television shows. The forecasted viewership for any particular item or items of content is affected by the level to which that content is promoted. Since such promotions may be set for the future, relying on past behavior will not suffice.

(E) Type of content. Adding a major new release blockbuster item or video will have a different effect on viewership than adding in a short clip of an old show. A forecast has to be aware of the difference between a new blockbuster item and a new clip or small effect item.

(F) Library of content churn. The set of items available for display is in constant churn as older items age and decay in viewership and new items are added to the library and drive new viewership. Looking backwards will not incorporate the new influx of different types of content and the different ages of content in their consumption life cycles.

Operating Sequence

Figure 5:
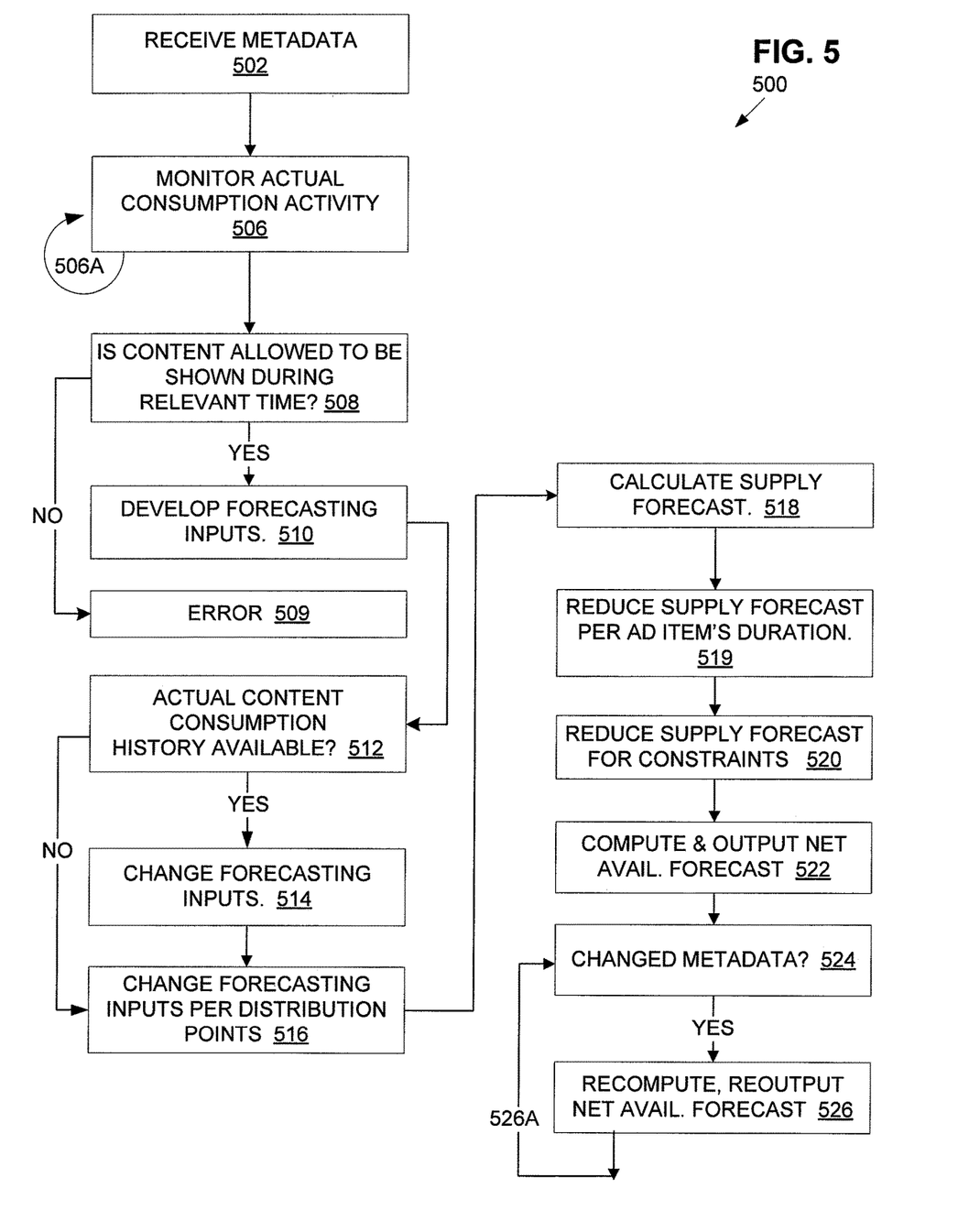
FIG. 5 is a flowchart of a computer-driven sequence for collecting various metadata and actual delivery history for a given host video, and transforming these into a highly accurate delivery forecast.

FIG. 5 shows a sequence 500 to illustrate one example of the operating sequence of this disclosure. Broadly, this sequence serves to collect various metadata and actual delivery history for a given item of streaming video content and its advertising opportunities, and to computationally transform these into a highly accurate forecast of actual delivery of online advertisement.

The sequence 500 is illustrated in the context of a particular item of online video content, this being referred to as the "given item" or "host video" or "content item," As described below, the forecasting approach of the sequence 500 is based on the core concept of the individual content item, such as an episode of a TV show or a movie. This content item is the central organizational theme, rather than being based on a website or location where the content is displayed. This enables the forecast system to intelligently incorporate the individual items characteristics into the forecast.

The sequence 500 is also considered in conjunction with a proposed class of advertisements, making the ultimate forecast even more realistic as to the availability of advertising opportunities for the client. It is useful to consider features of the proposed class of advertisements, since the encoding format or length or other characteristics of the proposed ad class may limit the available advertising opportunities.

In step 502, the apparatus 150 receives machine-readable metadata from one or more of the remote sources 124. Some of this metadata pertains to the host video on which the various advertising opportunities are planned to occur via embedded streaming advertisements or parallel display ads. This may be referred to as "supply" metadata, and some examples include the following.

Duration of advertising opportunities. This is a statement of the duration of advertising opportunities provided by the host video content. For example, this may be a time in hours-minutes-seconds for each opening, and may further include an indication of whether the host video is one-time or episodic. In the case of display advertising, this may additionally designate other characteristics of advertising opportunity, such as pixel size, screen placement, and other characteristics of display advertising.

Legal Rights. This is a statement as to legal rights to present the host video. Digital content might be is owned by one company but displayed by a different company. These companies enter into rights arrangements where the display company will contract with the owning company for when and where they are allowed to display particular content. Such display rights windows change, and can open and close frequently. They also change from one host video to another. This is included in the metadata 502 so that the present forecast can accurately consider the opening and closing of such rights windows. In one example, the statement of legal rights may be embodied in the form of a span of relevant calendar dates during which the host video is permitted to run according to contractual agreement, and may also be referred to as "display rights."

Rating. This is a rating of the host video as to potentially offensive material. For example, this may be a G, R, PG-13, or other rating according to the Motion Picture Association of America or another rating body.

Syndication. This refers to a representation as to use of syndication partners if any. This indicates where the host video is planned to run, and may include web addresses and/or identification of a syndication partner such as CBS™, YAHOO™, AOL™, YOUTUBE™, and the like.

Type of content. Adding a major new release blockbuster item or video will have a different effect on your viewership than adding in a short clip of an old show. This is included in the metadata 502 so that the present forecast can consider the difference between a new blockbuster item and a new clip or small effect item. In one example, the host video is classified according to the most appropriate one of the following content types: (1) a "clip," which lasts for five minutes or ten minutes, (2) an "episode," which lasts for twenty-two minutes or forty-four minutes, or (3) a "movie" which lasts for one hour or more greater. Host videos are classified according to the closest one of these types.

Constraints. This is a consideration of business terms, such as whether the producer of the host video prohibits advertising of certain subject matter or content rating. The constraints may also consider whether the displayer of the video allows pre-rolls, which are typically brief streaming advertisements that appear prior to the host video. Another example of a constraints is "blacklisting." For example, the client may input information pertaining to a known contract between the producer of the host video and a particular advertising buyer. Thus, if the host video producer has a contract to advertise COKE™ products, then during later computing steps below, this constraint would be helpful to exclude excluding PEPSI™ as a buyer of advertising during later computational steps discussed below.

Encoding. This refers to machine-readable encoding format of the host video. The given item may take many forms, such as H.264, Quicktime™, MPEG-2, MP4, WMV, AVI, and MOV, to name a few. In the case of display advertising, some additional formats may include JPG, GIF, PNG, and the like, as well as display size in pixels. Also, this may consider the features of the particular display environment, such as hardware, operating system, and the like.

The previously described metadata items pertain to the host video and refers to "supply" metadata. Step 502 additionally receives various items "demand" metadata, these pertaining to the characteristics of a proposed class of advertisements for which the present delivery forecast will be applicable. This may be an actual advertising item that the client has in mind, or alternatively a class of items characterized by the restrictions of this metadata. Some examples of demand metadata of step include the following.

Time window. This is a span of relevant calendar dates for which placement of the proposed class of advertisements is being forecast.

Permissible Content. This is the client's specification as to a required content rating of the advertising to be placed into the host video. For instance, regardless of the content rating of the host video, the client may impose a requirement that all advertising to be placed into the host video must adhere to a PG-13 rating. The content ratings of advertising, in this example, may use the same or different rating system as the host videos. Nevertheless, the client's specification of content rating as to permissible advertising is independent of the rating applied to the host video.

Encoding. This refers to the machine-readable encoding format of the proposed class of advertising items. The format of advertisements of the proposed class is independent of the format of the host video item, and must be separately considered.

Duration. The duration of advertisements of the proposed class is important to consider, because proposed ads that are too long might not fit inside the advertising opportunities provided in the host video.

Although receipt of metadata is limited to step 502 as illustrated, this is merely for ease of explanation, and such metadata may be may received over time, in batch, randomly, on a schedule, or other basis. Moreover, step 502 may be performed upon machine or user-initiated demand by any of the apparatus 150, client machine, or other source. In one embodiment, the processor 106 stores metadata from step 502 in the local database 109.

In step 506, the apparatus 150 monitors actual delivery of advertising related to the given host video item. This occurs by receiving transmissions from consumers' display devices 126 via the input/output 108. As mentioned above, the display devices 126 are operated by members of the public without any required affiliation with the advertising companies or forecasting company. Yet, in step 506, the apparatus 150 is able to monitor peoples' viewing of display and streaming video advertisements. Namely, the display devices 126 are programmed to transmit information to the apparatus 150 whenever the consumer elects to view that advertisement. For example, this may be triggered by a consumer mouse-clicking on the advertisement. The transmitted information includes the identity of ad that was viewed, URL that hosted the online ad, time when viewing began, length of viewing, duration of the host video viewed before exiting, and any other relevant information. The transmission of such information to the apparatus 150 may be conducted according to a browser plug-in, java applet, HTML code used to present the advertisement, or another technology. The technology for achieving this is widely known in the field of Internet advertising metrics.

As an alternative to receiving data directly from viewers' browsers, the browsers may transmit such information to a given different server, such as the company on whose behalf the advertisement is being placed. In this scenario, such a server collects viewing information from the browsers, and forwards this to the apparatus 150. At any rate, step 506 is performed on an ongoing basis, as shown by 506a.

In step 508, the apparatus 150 determines whether the host video is permitted to be shown during the requested time window for placement. This determination is made by comparing the requested legal display rights from step 502 with the proposed time window, also from step 502. Forecasting consumption for advertising opportunities of a content item before it is allowed to display will be inaccurate and over-count. However, it is important to be able to forecast items in advance of their display date to be able to sell advertising into that item in advance. Television upfronts are an example where much advertising is sold into shows that will not air for months. So, being aware, item by item, of when it will start display makes this possible. Forecasting consumption of an ad after the host video is to be taken down and no longer available for viewing would over-count. By being aware of display rights end dates, the system will avoid forecasting consumption after advertising items are no longer available for consumption.

If display is not permitted according to step 508, the apparatus 150 issues an error message in step 509. This message may be presented locally at the interface 107, displayed on a web page that the apparatus 150 presents to the client, or transmitted to a remote site.

If step 508 answers "YES," then the apparatus 150 develops certain forecasting inputs in step 510. In one example, these forecasting inputs are referred to by the names feed-1, feed-2, feed-3, and described as follows. Also as discussed below, the forecasting inputs in step 510 are developed predictively based on similar host videos, and apart from any actual observations, which are discussed separately below.

Feed-1 is a forecast of how many times viewing of the host video will be commenced. In one example, the database 109 contains a variety of pre-prepared profiles for feed-1, each linked to a different "type" of host video. As mentioned above, the host video types included clips, episodes, and movies. In the present example, step 508 recalls the pre-prepared feed-1 profile appropriate to the host video content type received in the metadata of step 502. Each feed-1 profile, according to one example, includes a curve representing a number of views by consumers over time, such as the curve 602 in FIG. 6. These have been developed previously by collecting and then sorting history data by content type, and statistically developing common patterns of magnitude of maximum views, growth, and decay curve of views from day one to a time when host video views decay to a negligible amount.

Feed-2 is distinct from feed-1 and comprises a forecast, as to the given host video, of how many advertising opportunities will be requested by consumers' display devices. Namely, each time a consumer begins viewing a host video, the web browser or other display device submits a request indicating a certain number of advertising opportunities appropriate to the host video. In step 510, feed-2 may be predicted by multiplying feed-1 by the number of advertising opportunities within the currently considered host video. The number of advertising opportunities within the host video may be input as part of the metadata 502, or this may be a standard number, such as X advertising opportunities of thirty seconds during a clip, Y advertising opportunities during an episode, and Z advertising opportunities during a movie.

Feed-3 is a forecast of how many advertising opportunities will be actually viewed or "consumed." Consumers may not view the entire host video, in which case, the later advertising opportunities of the host video do not come to fruition. In the present operation, feed-3 is developed by recalling a pre-prepared profile appropriate to the content type of the host video. Such profiles are generated based on historical data for host videos of the same content type, such as clip, episode, and movie in the present example.

Thus, step 510 develops forecasting inputs comprising feed-1, feed-2, and feed-3 based on historical data for host videos of similar content type. Next, in step 512, the apparatus 150 asks if any actual consumption data is available, arising from consumers' views of the given host video in step 506. This would provide actual data for feed-1, feed-2, and feed-3.

If actual data is available, the apparatus 150 adjusts the forecasting inputs of step 510 according to the actual consumption history, in step 514. In one example, the apparatus 150 conditions the purely predictive forecasting inputs of step 510 by the actual data to arrive at some forecasting inputs of improved accuracy. In a different example, step 514 substitutes the actual data for the predictive inputs of step 510.

Figure 6:
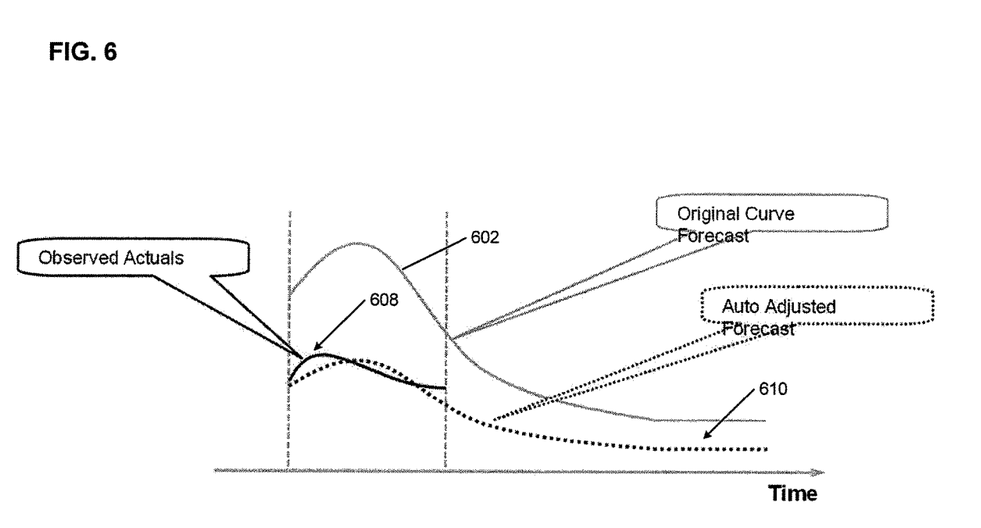
FIG. 6 is a graph illustrating the adjustment of forecasted delivery to account for actual delivery history.

The following is an example, as to the adjustment of feed-1 per actual consumption history. In FIG. 6, curve 608 represents the feed-1 for the given host video, according to actual consumption history. In step 512, the apparatus 150 conditions the curve 602 according to the curve 608, taking into account the curve 608's shape, slope, magnitude, and other characteristics. The result is the curve 610. In one example, the curves 602, 608 are nonlinear curves that increase exponentially to a certain maximum, and then decay for some length. As to feed-2 and feed-3, these are numbers or multiplicative coefficients rather than curves over time, and the actual data from step 506 may be used to scale these numbers higher or lower as appropriate.

If actual data is not available in step 512, then the sequence skips step 514, and proceeds to step 516. In step 516, the apparatus 150 predicatively adjusts the forecasting inputs feed-1, feed-2, and feed-3 based on the current or planned distribution points. Distribution points include, for example, syndication partners, web addresses, web sites, and the like. For example, the database 109 may contain a listing of known syndication partners and empirically developed coefficients for each syndication partner indicating how a given syndication partner has historically affected forecasts. Thus, in a simple case, step 516 is carried out by multiplying the forecasting inputs from step 514, or 510, by the coefficients for the applicable syndication partners.

In step 518, the apparatus 150 computes a supply forecast. In the present example, this is feed-1 multiplied by feed-2, and reduced by feed-3. This represents a prediction of how many theoretical opportunities are available to place an ad in conjunction with the host video, and which will actually be viewed by a human being. This quantity may be referred to as "unconstrained available supply."

In step 519, the apparatus 150 reduces the supply forecast according to the duration of the proposed class of advertising items. Namely, the predicted advertising opportunities of step 518 are reduced by the number of opportunities that are not long enough to accommodate the duration, from step 502, of the proposed class of advertisements.

In step 520, the apparatus 150 further reduces the supply forecast, according to the constraints received in metadata 502 that would prevent use of the propose class of advertisements with the host video. For instance, step 519 may reduce the current forecast by the number of advertising opportunities for which the host video producer does not allow advertisements of the content rating of the proposed class of advertisements. Other constraints are applied in step 520, such as whether pre-rolls are allowed, client-specified blacklisting, machine-readable encoding format, and the like.

In step 522, the apparatus 150 computes a forecast of net available advertising opportunities. This is the supply forecast, from step 520, reduced by the existing commitments, namely, the advertising opportunities that are known to be sold already: In other words, step 522 considers advertising opportunities in the relevant time window that are already booked and sold for other ads. This information may arise from the client, via previous input, or by other ongoing operations of the apparatus 150 pertaining to management of the client's advertising resources.

Also in step 522, the apparatus 150 provides a human-readable output of the forecast of net available advertising opportunities. For example, the apparatus 150 may provide a visual display at the interface 107, or transmit machine-readable signals over the network 112 for viewing the forecast on a remote computer. In a more specific example, the output occurs via the user interface 122a in the form of an interactive web page.

In step 524, the apparatus 150 considers whether it has received client-submitted changes to any of the underlying metadata 502, 504. If changes have occurred, the apparatus 150 in step 526 re-computes the forecast of step 522. The re-computation may occur automatically, according to metadata changes, or manually in response to client request or other input. For instance, the apparatus 150 may receive these via the user interface 122a in the form an interactive web page. The re-computation of step 526 may be carried out by repeating all of the steps from 508-520, or by repeating those steps appropriate to the metadata that was changed. Thus, the apparatus 150 permits the client to change the metadata on the fly to study various "what-if" scenarios. Steps 524 and 526 are performed on an ongoing basis, as shown by 526a.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the invention, and the scope of the present invention fully encompasses other embodiments which may become obvious to those skilled in the art, and that the scope of the present invention is accordingly to be limited by nothing other than the appended claims.

The invention claimed is:

1. A method, comprising:
receiving, by a computing system, metadata that indicates a duration of a video content item;
receiving historical data indicating a frequency of output, by a plurality of video content output devices, of one or more other video content items over a first time period;
determining, based on the duration of the video content item and based on the historical data, an expected plurality of available advertising opportunities, associated with the video content item, over a second time period;
receiving, by the computing system, from the plurality of video content output devices, and via a network, data indicating output, by the plurality of video content output devices, of one or more advertisements in one or more advertising opportunities provided by output of the video content item over a first portion of the second time period;
determining, by the computing system and based on the data indicating the output of the one or more advertisements in the one or more advertising opportunities, an updated expected plurality of available advertising opportunities over the second time period;
determining, by the computing system, sizes in pixels of a plurality of advertisements, a size in pixels of an advertising opportunity of the updated expected plurality of available advertising opportunities, and a screen position available for the advertising opportunity;
selecting, by the computing system, an advertisement that is compatible with a size in pixels of a first video content output device and with the size in pixels of the advertising opportunity of the updated expected plurality of available advertising opportunities; and
sending, to the first video content output device, the selected advertisement for output via the first video content output device at an advertising opportunity provided by output of the video content item.

2. The method of claim 1, wherein receiving the historical data indicating the frequency of output of the one or more other video content items comprises:
receiving first historical data indicating a first frequency of output, by the plurality of video content output devices and over the first time period, of a plurality of other video content items; and
selecting, from the first historical data and based on a comparison of the duration of the video content item and durations of the plurality of other video content items, the historical data indicating the frequency of output of the one or more other video content items.

3. The method of claim 1, further comprising: identifying the plurality of advertisements by, for each advertisement of the plurality of advertisements, determining that a characteristic of the advertisement satisfies one or more corresponding characteristics of the video content item, wherein the one or more corresponding characteristics comprise one or more of:
an encoding format,
a size in pixels,
a screen placement,
a time duration,
a start time,
an end time, or
dates of availability for output of the video content item.

4. The method of claim 1, further comprising: identifying the plurality of advertisements by, for each advertisement of the plurality of advertisements, determining that the advertisement meets one or more content requirements of the video content item.

5. The method of claim 1, further comprising: identifying the plurality of advertisements by, for each advertisement of the plurality of advertisements, determining that a version of the advertisement is available with a content rating that satisfies a content rating requirement of the video content item.

6. The method of claim 1, further comprising: identifying the plurality of advertisements by, for each advertisement of the plurality of advertisements, determining that the advertisement is available for output within a date range that the video content item is available for output.

7. The method of claim 1, further comprising determining an encoding format of the video content item and one or more encoding formats of the plurality of advertisements, and wherein selecting the advertisement comprises determining that the advertisement is available in an encoding format associated with the video content item.

8. The method of claim 1, wherein determining the expected plurality of available advertising opportunities comprises determining, based on the duration of the video content item and the historical data indicating the frequency of output of the one or more other video content items over the first time period, an expected number of times the video content item will be output over the second time period.

9. The method of claim 8, wherein receiving the historical data indicating the frequency of output of the one or more other video content items comprises:
selecting the one or more other video content items based on determining that the one or more other video content items are episodic shows, and
wherein determining the expected plurality of available advertising opportunities comprises determining that the video content item is an episodic show.

10. The method of claim 1, wherein determining the expected plurality of available advertising opportunities comprises:
determining a length of time since the video content item became available;
receiving data indicating a number of times that the video content item has been output since the video content item became available;
comparing the number of times that the video content item has been output since the video content item became available to a number of times that the one or more other video content items were output over a portion of the first time period, wherein the portion of the first time period has a length of the length of time since the video content item became available; and
based on the comparison between the number of times that the video content item has been output since the video content item became available to the number of times that the one or more other video content items were output over the portion of the first time period, determining a number of times the video content item will be output over a third time period.

11. The method of claim 1, wherein historical data indicating the frequency of output of the one or more other video content items comprises data indicating one or more frequencies of output, of the one or more other video content items, via one or more content distributors over the first time period; and
wherein determining the expected plurality of available advertising opportunities comprises receiving information that the video content item will be available for output, by the plurality of video content output devices and over the second time period, via a content distributor of the one or more content distributors.

12. The method of claim 1, wherein determining the expected plurality of available advertising opportunities comprises determining, based on a level of promotion associated with the video content item, an expected number of times the video content item will be output.

13. The method of claim 1, wherein receiving the historical data comprises:
based on a comparison of a content type of the video content item to content types of a plurality of other video content items comprising the one or more other video content items, selecting the historical data from first historical data indicating a frequency of output, by the plurality of video content output devices and over the first time period, of the plurality of other video content items.

14. The method of claim 1, wherein the data indicating the output of the one or more advertisements comprise data indicating one or more time points, during the video content item, at which the one or more advertisements were output, and wherein determining the updated expected plurality of available advertising opportunities comprises determining, based on the one or more time points at which the one or more advertisements were output, a number of advertising opportunities for outputting of advertisements during output of the video content item.

15. The method of claim 1, wherein the frequency of output of the one or more other video content items over the first time period is based on a plurality of frequencies of output of the one or more other video content items over different portions of the first time period; and
wherein determining the updated expected plurality of available advertising opportunities comprises determining, based on a comparison of a change in the plurality of frequencies of output of the one or more other video content items over a portion of the first time period and a change in a plurality of frequencies of output of the video content item over a portion of the second time period, an expected change in output of the video content item over a date range that the video content item is available for output.

16. The method of claim 15, wherein the change in the plurality of frequencies of output of the video content item is over an initial portion of the date range, and wherein determining the updated expected plurality of available advertising opportunities comprises determining, based on the change in the plurality of frequencies of output of the video content item during the initial portion of the date range, a viewing-drop-off rate for the video content item over a subsequent portion of the date range.

17. The method of claim 1, wherein determining the updated expected plurality of available advertising opportunities comprises determining, based on the historical data comprising information indicating a plurality of distributors that streamed the one or more other video content items for output by the plurality of video content output devices, an audience size for each distributor of the plurality of distributors.

18. The method of claim 1, wherein the plurality of video content output devices comprise one or more mobile devices and one or more set-top boxes, and wherein receiving the data comprises:
receiving, by the computing system and from the one or more mobile devices, a first portion of the data; and
receiving, by the computing system and from the one or more set-top boxes, a second portion of the data.

19. The method of claim 1, further comprising:
determining one or more characteristics of a curve depicting a number of the expected plurality of available advertising opportunities over time; and
causing output of the curve.

20. The method of claim 19, further comprising:
modifying the one or more characteristics of the curve to depict numbers of the updated expected plurality of available advertising opportunities over time; and
causing output, based on the modified one or more characteristics of the curve, of the curve.

21. The method of claim 1, further comprising:
determining one or more characteristics of a curve depicting data indicating output of at least a portion of the video content item by the plurality of video content output devices, wherein the data indicating the output of at least the portion of the video content item comprises the data indicating output of the one or more advertisements; and
generating a graphical user interface comprising the curve.

22. The method of claim 1, wherein determining the expected plurality of available advertising opportunities comprises determining, based on data indicating a number of times the video content item has been output and the historical data, a number of times that at least a portion of the video content item will be output.

23. The method of claim 1, wherein determining the expected plurality of available advertising opportunities comprises determining a number of times for inserting advertisements within the video content item.

24. The method of claim 23, wherein the data indicating output of the one or more advertisements comprise information indicating a portion of the video content item output before output of the one or more advertisements; and
wherein determining the number of times for inserting advertisements within the video content item is further based on the portion of the video content item.

25. The method of claim 1, further comprising:
determining, by the computing system, a second advertisement, of the plurality of advertisements; and
sending, to a second video content output device of the plurality of video content output devices, the second advertisement for output during a second advertising opportunity provided by output of the video content item.

26. The method of claim 1, wherein determining the expected plurality of available advertising opportunities comprises determining, based on a plurality of available advertising opportunities for a second video content item of a content type of the video content item, the expected plurality of available advertising opportunities.

27. The method of claim 1, wherein determining the updated expected plurality of available advertising opportunities comprises updating, based on a number of content access points, the expected plurality of available advertising opportunities.

28. The method of claim 1, wherein the data comprises a uniform resource locator of a website hosting one of the one or more advertisements.

29. The method of claim 1, wherein receiving the historical data indicating the frequency of output of the one or more other video content items comprises determining that one or more durations of the one or more other video content items are within a predefined range of the duration of the video content item.

30. The method of claim 1, wherein the data indicating output of the one or more advertisements comprise data indicating a mouse click on the one or more advertisements.

31. The method of claim 1, further comprising determining, based on the duration of the video content item and one or more durations of the one or more other video content items, that the video content item and the one or more other video content items are each a video clip.

32. The method of claim 1, further comprising determining, based on the duration of the video content item and one or more durations of the one or more other video content items, that the video content item and the one or more other video content items are each an episode of a show.

33. The method of claim 1, further comprising determining, based on the duration of the video content item and one or more durations of the one or more other video content items, that the video content item and the one or more other video content items are each a movie.

34. The method of claim 1, wherein the historical data indicating the frequency of output of the one or more other video content items comprises a number of times that the one or more other video content items were output, by the plurality of video content output devices, over the first time period.

35. A method, comprising:
receiving, by a computing system, historical data indicating frequencies of output, by a plurality of user devices and over a first time period, of one or more first digital video content items having one or more first run-times;
determining, by the computing system and based on a comparison of a run-time of a digital video content item and the one or more first run-times, an expected frequency of output, by the plurality of user devices, of the digital video content item over a second time period;
determining, based on the expected frequency of output of the digital video content item, a number of advertising opportunities expected to be available during output of the digital video content item over the second time period;
receiving, by the computing system, from the plurality of user devices, and via a network, first data indicating a number of times at least a portion of the digital video content item was streamed to the plurality of user devices via the network, wherein the first data comprises an indication of output, by the plurality of user devices, of a first advertisement over an initial portion of the second time period;
updating, by the computing system and based on the first data, the number of advertising opportunities;
receiving, by the computing system and from a user device of the plurality of user devices, a size in pixels of the user device;
determining, by the computing system, sizes in pixels of a plurality of advertisements, a size in pixels of an advertising opportunity expected to be available during output of the digital video content item, and a screen position available for the advertising opportunity;
selecting, by the computing system, an advertisement that is compatible with the size in pixels of the user device and with the size in pixels of the advertising opportunity; and
sending, to the user device, the advertisement for output via the user device during the advertising opportunity provided by output of the digital video content item during the second time period.

36. The method of claim 35, wherein the expected frequency of output of the digital video content item is further based on a comparison of one or more characteristics of the digital video content item and one or more corresponding characteristics of the one or more first digital video content items, wherein the one or more characteristics of the digital video content item comprise one or more of:
an encoding format,
a size in pixels,
a screen placement,
a start time,
an end time, or
dates of availability for output of the digital video content item.

37. The method of claim 35, wherein determining the number of advertising opportunities is further based on one or more of:
whether the digital video content item comprises an episode of episodic content, or
whether the digital video content item comprises new content.

38. The method of claim 35, wherein determining the number of advertising opportunities comprises determining, based on the run-time of the digital video content item, a number advertising opportunities associated with streaming an instance of the digital video content item.

39. The method of claim 35, wherein the indication of output of the first advertisement comprises an indication of an election, via a user device of the plurality of user devices, of the first advertisement, wherein the first data further indicates a time point during the digital video content item at which the election was made, and wherein updating the number of advertising opportunities comprises reducing the number of advertising opportunities based on the time point during the digital video content item relative to the run-time.

40. The method of claim 35, wherein determining the number of advertising opportunities comprises determining a drop-off rate in output of the digital video content item over a timeframe that the digital video content item is available for streaming.

41. The method of claim 35, wherein the plurality of user devices comprise one or more mobile devices and one or more set-top boxes, and wherein receiving the first data further comprises:
   receiving, by the computing system and from at least one of the one or more mobile devices, a first portion of the first data; and
   receiving, by the computing system and from at least one of the one or more set-top boxes, a second portion of the first data.

42. The method of claim 35, wherein the historical data indicating frequencies of output comprises numbers of times that the one or more first digital video content items having the one or more first run-times were output by the plurality of user devices and over the first time period.

43. The method of claim 35, wherein the expected frequency of output, by the plurality of user devices, of the digital video content item over the second time period comprises an average of the frequencies of output of the one or more first digital video content items.

44. A method, comprising:
   receiving, by a computing system, metadata that indicates one or more characteristics of a video content item;
   receiving historical data indicating a plurality of profiles of output, by a plurality of video content output devices and over a first time period, of a plurality of other video content items;
   selecting, based on a comparison between the one or more characteristics of the video content item and one or more corresponding characteristics of the plurality of other video content items, one or more profiles of output, of the plurality of profiles of output of the plurality of other video content items, of one or more other video content items of the plurality of other video content items;
   determining, based on the one or more profiles of output of the one or more other video content items and the one or more characteristics of the video content item, an expected plurality of available advertising opportunities over a second time period;
   receiving, by the computing system, from the plurality of video content output devices, and via a network, first data indicating output of at least a portion of the video content item by the plurality of video content output devices over a first portion of the second time period, wherein the first data comprises an indication of output, by the plurality of video content output devices, of a first advertisement;
   determining, by the computing system and based on the first data, an updated expected plurality of available advertising opportunities, wherein the updated expected plurality of available advertising opportunities comprises an advertising opportunity period provided by output of the video content item;
   receiving, by the computing system and from a video content output device of the plurality of video content output devices via the network, a size in pixels of the video content output device;
   determining, by the computing system, sizes in pixels of a plurality of advertisements, a size in pixels of an advertising opportunity associated with the advertising opportunity period, and a screen position available for the advertising opportunity;
   selecting, by the computing system, an advertisement that is compatible with the size in pixels of the video content output device and with the size in pixels of the advertising opportunity; and
   sending, to the video content output device, the advertisement for output via the video content output device during the advertising opportunity period.

45. The method of claim 44, further comprising:
   determining a curve depicting at least a portion of the expected plurality of available advertising opportunities over the second time period; and
   generating a graphical user interface comprising the curve.

46. The method of claim 45, wherein determining the curve comprises determining, based on the metadata, a number of times the video content item will be output and a number of times for inserting advertisements within the video content item.

47. The method of claim 44, wherein the one or more characteristics comprise one or more of:
   whether the video content item is an episode of episodic content, or
   whether the video content item comprises new content.

48. The method of claim 44, further comprising:
   determining a curve depicting at least a portion of the updated expected plurality of available advertising opportunities; and
   generating a graphical user interface comprising the curve.

49. The method of claim 44, further comprising:
   based on comparing one or more first parameters, defining a shape of a first curve depicting a portion of the expected plurality of available advertising opportunities over the first portion of the second time period, with one or more second parameters, defining a shape of a second curve depicting at least a portion of the first data, determining one or more scaling factors,
   wherein determining the updated expected plurality of available advertising opportunities comprises scaling a second portion of the expected plurality of available advertising opportunities over a second portion of the second time period.

50. The method of claim 44, wherein the plurality of profiles of output each comprise numbers of output, by the plurality of video content output devices and over the first time period, of the plurality of other video content items.

51. The method of claim 44, wherein the one or more characteristics of the video content item comprise a duration of the video content item.

52. The method of claim 44, wherein the one or more characteristics of the video content item comprise a classification of the video content item as one of a video clip, an episode of a show, or a movie.

53. The method of claim 44, wherein the selecting the advertisement is further based on display capabilities, of the video content output device, to display video of one or more encoding formats.

54. The method of claim 44, wherein the selecting the advertisement is further based on a machine-readable encoding format of the video content item.

\* \* \* \* \*

UNITED STATES PATENT AND TRADEMARK OFFICE
CERTIFICATE OF CORRECTION

PATENT NO. : 11,470,400 B2
APPLICATION NO. : 16/819819
DATED : October 11, 2022
INVENTOR(S) : Heller et al.

It is certified that error appears in the above-identified patent and that said Letters Patent is hereby corrected as shown below:

In the Specification

Column 1, Cross-Reference To Related Applications, Line 8:
Delete "13,890,163," and insert --13/890,163,-- therefor Column 7, Detailed Description, Line 42:
After "decline", insert --.-- therefor Column 8, Detailed Description, Line 24:
Delete "item,"" and insert --item."-- therefor In the Claims Column 16, Claim 20, Line 54:
Delete "of the curve, of the curve." and insert --of the curve.-- therefor Signed and Sealed this
Twenty-sixth Day of December, 2023

Katherine Kelly Vidal
*Director of the United States Patent and Trademark Office*